(12) United States Patent
Nakhjavani

(10) Patent No.: US 11,008,120 B2
(45) Date of Patent: May 18, 2021

(54) SYSTEM AND METHOD FOR PREDICTING PRELIMINARY DESIGN REQUIREMENTS USING ARTIFICIAL NEURAL NETWORKS

(71) Applicant: The Boeing Company, Chicago, IL (US)

(72) Inventor: Omid Nakhjavani, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 984 days.

(21) Appl. No.: 15/603,190

(22) Filed: May 23, 2017

(65) Prior Publication Data

US 2018/0341850 A1    Nov. 29, 2018

(51) Int. Cl.
*B64F 5/00* (2017.01)
*G06N 3/08* (2006.01)
*G06F 30/15* (2020.01)
*G06F 30/23* (2020.01)
*G06F 113/28* (2020.01)

(52) U.S. Cl.
CPC .............. *B64F 5/00* (2013.01); *G06F 30/15* (2020.01); *G06F 30/23* (2020.01); *G06N 3/084* (2013.01); *G06F 2113/28* (2020.01)

(58) Field of Classification Search
CPC . B64F 5/00; G06F 30/23; G06F 30/15; G06F 2113/28; G06N 3/084; G06N 3/02
See application file for complete search history.

(56) References Cited

U.S. PATENT DOCUMENTS

| | | | |
|---|---|---|---|
| 2003/0033194 A1* | 2/2003 | Ferguson | G06Q 10/04 705/7.29 |
| 2010/0010794 A1* | 1/2010 | Sweers | G06F 30/20 703/8 |
| 2015/0227647 A1* | 8/2015 | Shelton | G06F 30/20 703/13 |

OTHER PUBLICATIONS

Nazzeri et al, Selection of Critical Load Cases Using an Artificial Neural Network Approach for Reserve Factor Estimation , 2015, Deutscher Luft-und Raumfahrtkongress (Year: 2015).*

* cited by examiner

*Primary Examiner* — Benjamin P Geib
(74) *Attorney, Agent, or Firm* — Perman & Green LLP

(57) ABSTRACT

A method for predicting preliminary design load cases using an artificial neural network, the method including obtaining, with a processor, historical data corresponding to an existing structural component, the historical data including finite element modeling analysis data and measured test data for the existing structural component, designing the artificial neural network to include a plurality of neurons to form a numerical model for preliminary design load cases of a new structural component, training, with the processor and the historical data for the existing structural component, the artificial neural network to predict the preliminary design load cases for the new structural component, providing input design parameters for the new structural component to the artificial neural network, and predicting, with the artificial neural network, the preliminary design load cases for the new structural component.

20 Claims, 6 Drawing Sheets

SYSTEM AND METHOD FOR PREDICTING PRELIMINARY DESIGN REQUIREMENTS USING ARTIFICIAL NEURAL NETWORKS

BACKGROUND

1. Field

The exemplary embodiments generally relate to product design and development and in particular to artificial neural networks for predicting preliminary design load cases.

2. Brief Description of Related Developments

Generally, in product development, certain design criteria are specified. At least some of the design criteria may be referred to as design requirements and objectives loads. These design requirements and objective loads represent the ultimate design static or dynamic loads that are to be expected during service (referred to herein as "envelope loads") of the product. The design requirements and objective loads are generally used extensively during the early design phases of the product for structural sizing of the product. The design requirements and objective loads are typically based on estimates of, for example, accelerations of the product and/or other certain characteristics (e.g. thrust, engine seizure torques, horsepower, rotational speeds, frictional forces and other nonlinearities).

The design requirements and objective loads are generally developed for a specific product by performing integrated finite element modeling and nonlinear transient analyses of the product. This analysis requires significant amounts of time, e.g. weeks or months, which may not be timely to support product development. As such, once design requirements and objectives loads are developed for a particular product those same loads tend to be used, with little to no refinement, as the design requirements and objectives loads for the preliminary design of other similar products. This leads to issues during product development where, during testing of the product, it is discovered that the design requirements and objectives loads used for the preliminary design are not similar to the actual loads exerted on the product during service. This in turn leads to a redesigning of the product based on the measured test data that is more accurate than and supersedes the design requirements and objectives loads. Redesign of the product due to incorrect modeling and nonlinear transient analyses during preliminary design is costly, both monetarily and time-wise, and may jeopardize the success of the product development.

SUMMARY

The following is a non-exhaustive list of examples, which may or may not be claimed, of the subject matter according to the present disclosure.

One example of the subject matter according to the present disclosure relates to a method for predicting preliminary design load cases using an artificial neural network the method comprising: obtaining, with a processor, historical data corresponding to an existing structural component, the historical data including finite element modeling analysis data and measured test data for the existing structural component; designing the artificial neural network to include a plurality of neurons to form a numerical model for preliminary design load cases of a new structural component; training, with the processor and the historical data for the existing structural component, the artificial neural network to predict the preliminary design load cases for the new structural component; providing input design parameters for the new structural component to the artificial neural network; and predicting, with the artificial neural network, the preliminary design load cases for the new structural component.

Another example of the subject matter according to the present disclosure relates to an apparatus for predicting preliminary design load cases with an artificial neural network, the apparatus comprising: a database including historical data corresponding to an existing structural component, the historical data including finite element modeling analysis data and measured test data for the existing structural component; a processor in communication with the database, the processor being configured to design at least one artificial neural network to include a plurality of neurons to form a numerical model for preliminary design load cases of a new structural component; train the at least one artificial neural network to predict the preliminary design load cases for the new structural component using the historical data for the existing structural component; input design parameters for the new structural component into the artificial neural network; and utilize the artificial neural network to predict the preliminary design load cases for the new structural component.

Still another example of the subject matter according to the present disclosure relates to a non-transitory computer readable medium storing computer readable instructions that when executed by a computer cause the computer to perform a method comprising: obtaining, with a processor, historical data corresponding to an existing structural component, the historical data including finite element modeling analysis data and measured test data for the existing structural component; designing an artificial neural network to include a plurality of neurons to form a numerical model for preliminary design load cases of a new structural component; training, with the processor and the historical data for the existing structural component, the artificial neural network to predict preliminary design load cases for the new structural component; providing input design parameters for the new structural component to the artificial neural network; and predicting, with the artificial neural network, the preliminary design load cases for the new structural component.

BRIEF DESCRIPTION OF THE DRAWINGS

Figure 1:
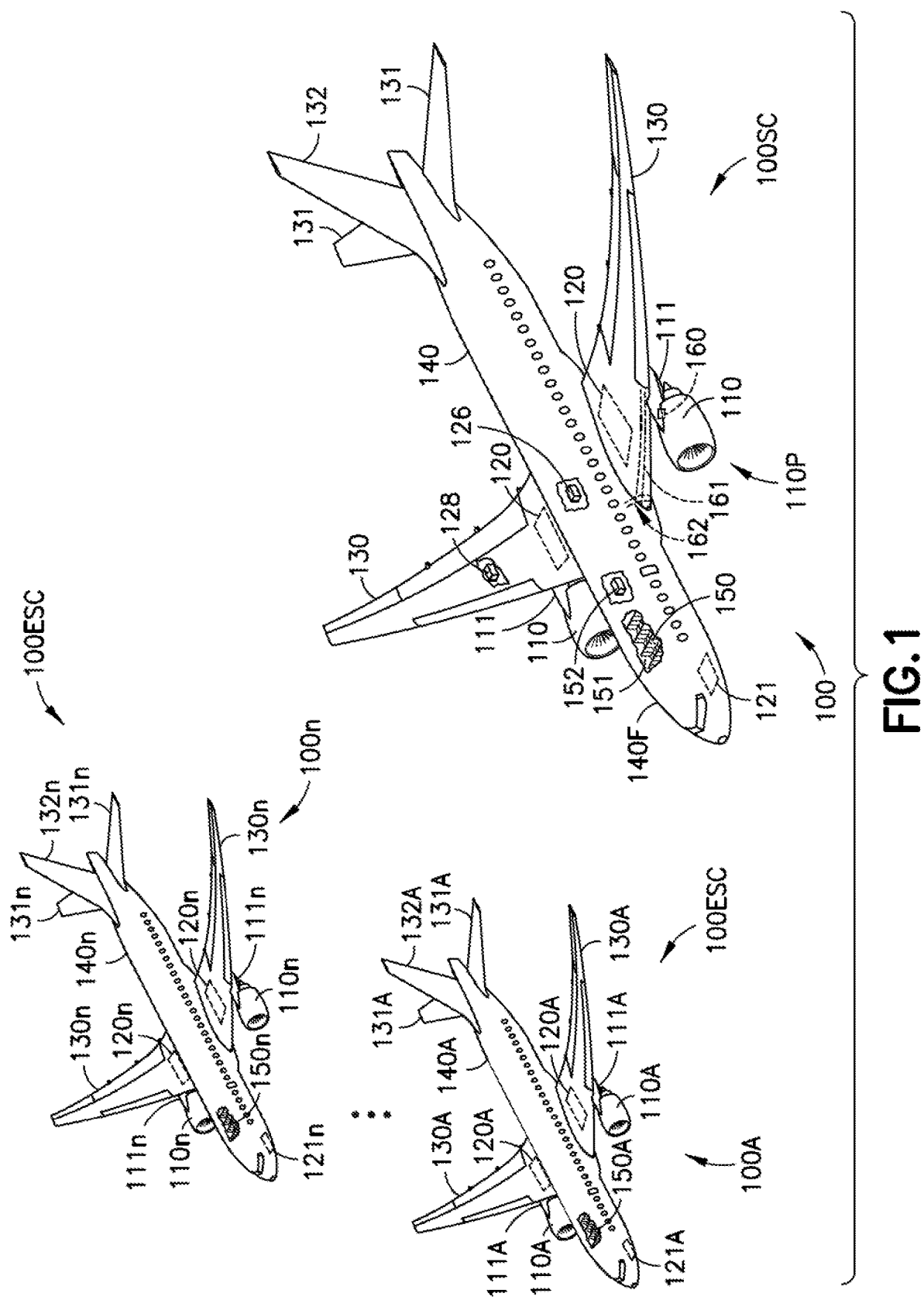
Figure 2:
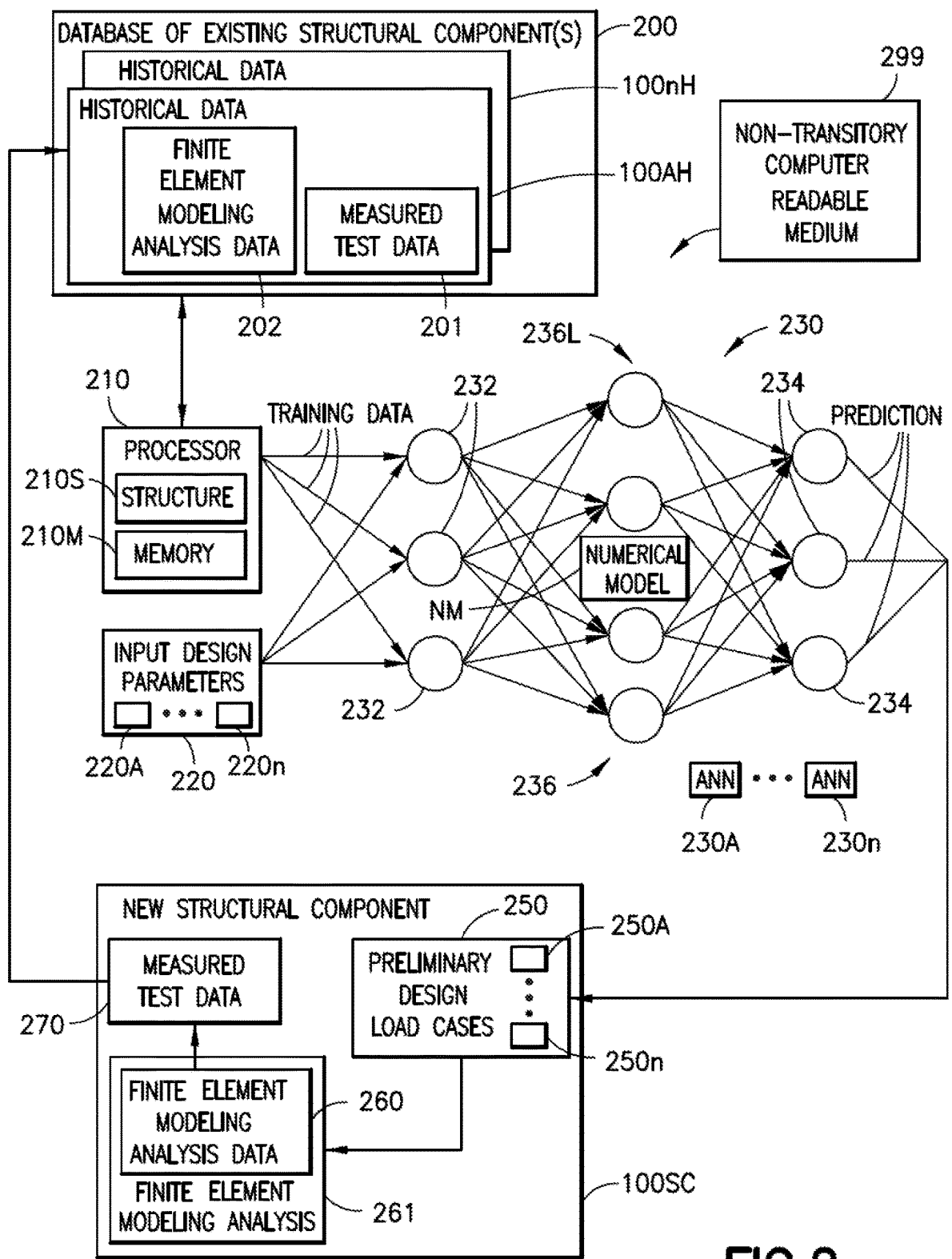
Figure 3:
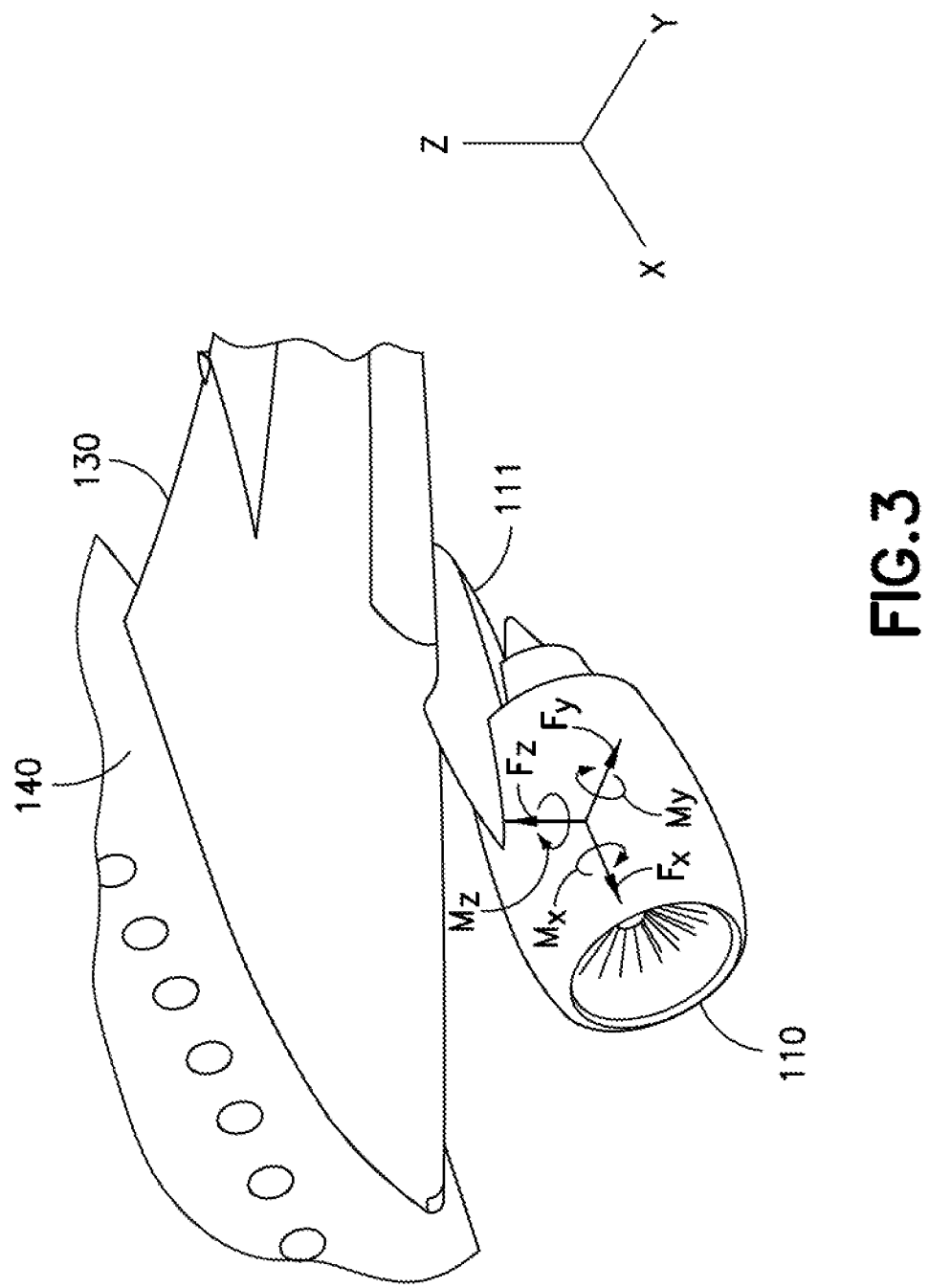
Figure 4:
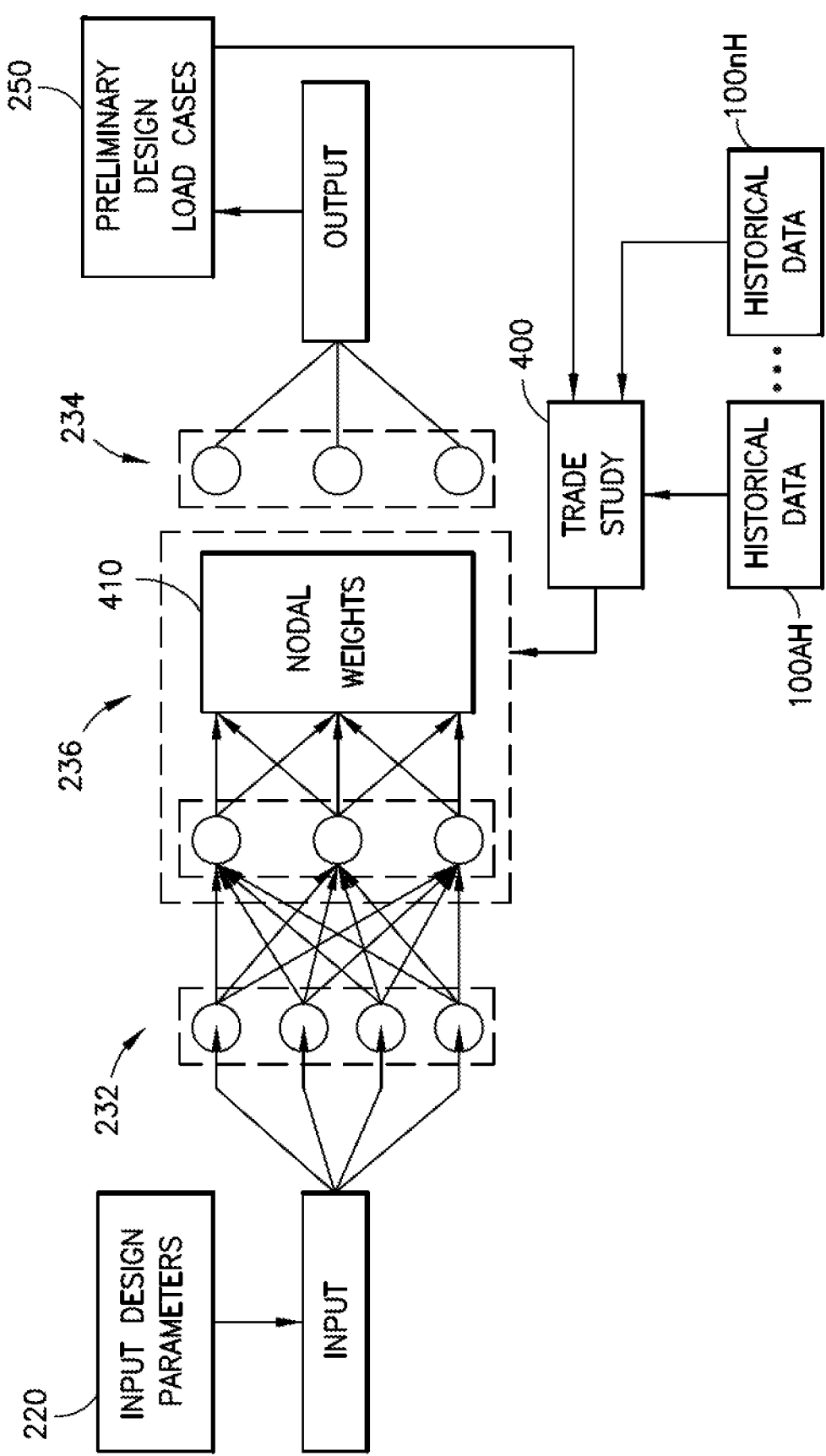
Figure 5:
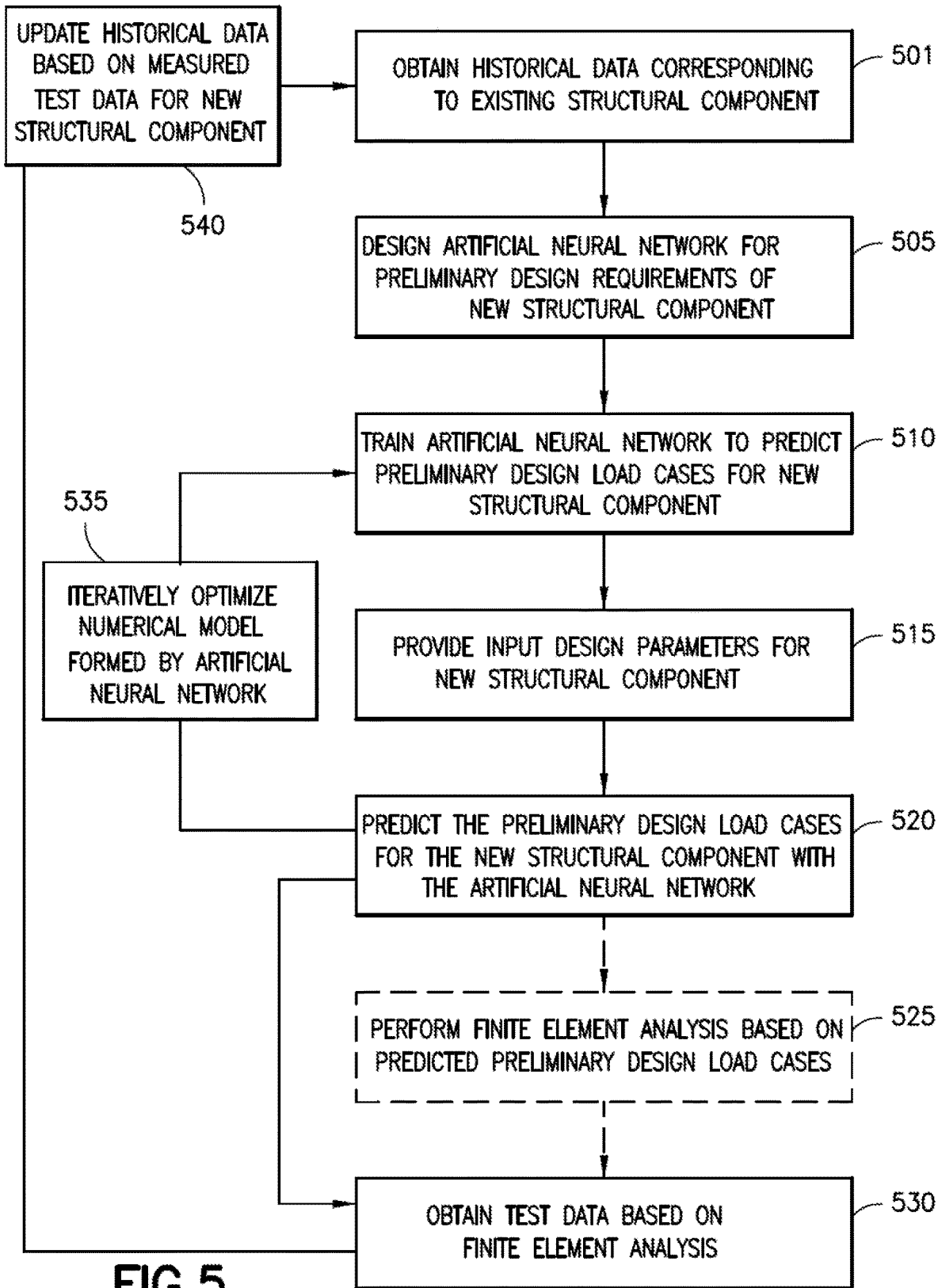
Figure 6:
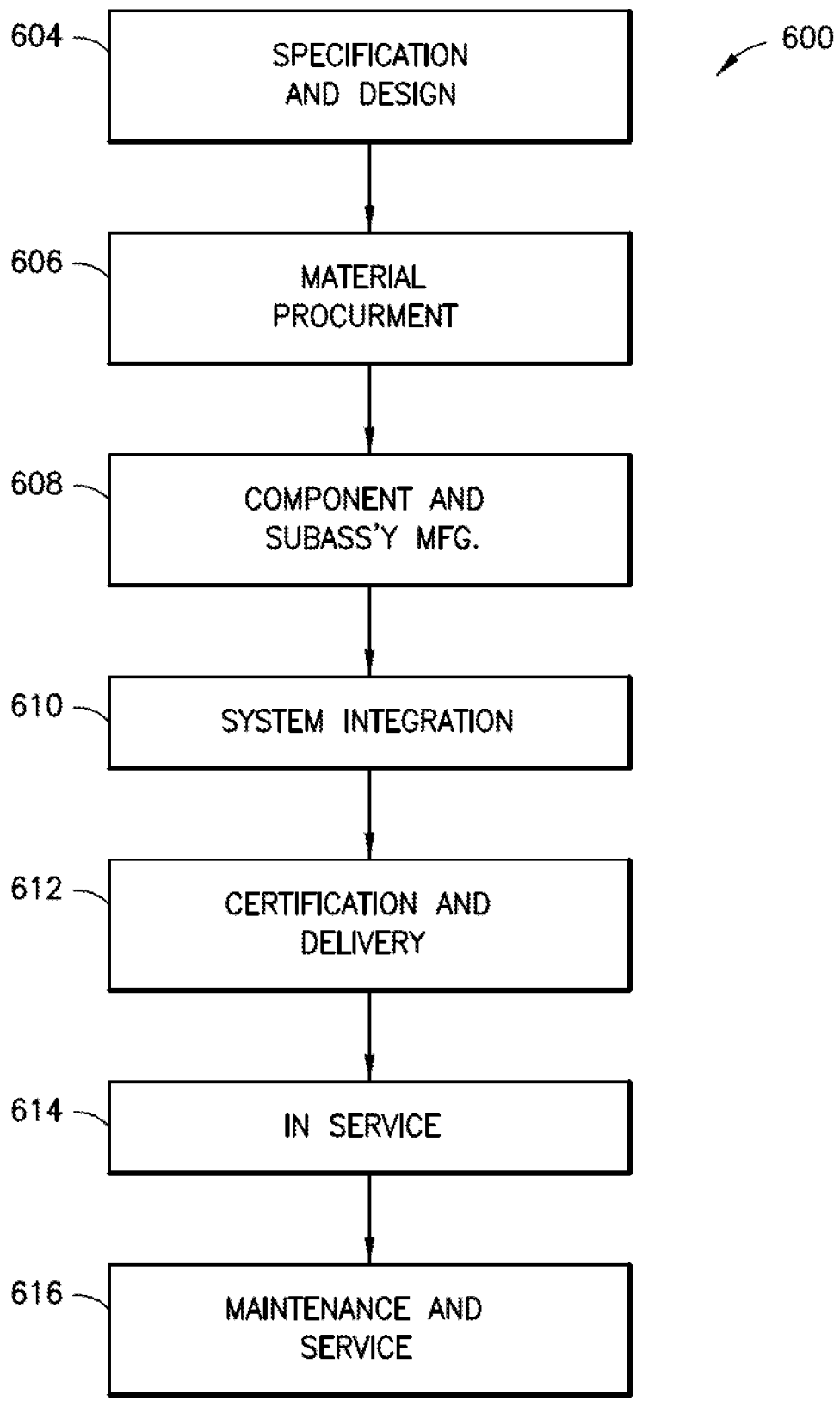

Having thus described examples of the present disclosure in general terms, reference will now be made to the accompanying drawings, which are not necessarily drawn to scale, and wherein like references characters designate the same or similar parts throughout the several views, and wherein:

FIG. 1 is a schematic perspective view of a new structural component and several existing structural components in accordance with aspects of the present disclosure;

FIG. 2 is a schematic illustration of the prediction of preliminary design load cases with a neural network in accordance with aspects of the present disclosure;

FIG. 3 is a schematic illustration of a preliminary design load case for a new structural component as determined by the neural network of FIG. 2 in accordance with aspects of the present disclosure;

FIG. 4 is a schematic illustration of the neural network of FIG. 2 in accordance with aspects of the present disclosure;

FIG. 5 is a flow diagram of a method in accordance with aspects of the present disclosure; and FIG. 6 is a flow diagram of a method in accordance with aspects of the present disclosure.

DETAILED DESCRIPTION

The aspects of the present disclosure described herein may provide a method, apparatus and non-transitory computer program product that predicts, with at least one artificial neural network, preliminary design load cases for the design/development of a new structural component. According to the aspects of the present disclosure, the artificial neural network considers all inputs that may or may not normally be considered by an engineer during the preliminary design of the structural component. For example, the structural component being designed may be part of a larger structure (e.g. a vehicle, building, vessel, etc.). The artificial neural network considers, for example, histories of finite element modeling analysis data and measured test data for each structural component of each larger structure in a database of existing structural components to predict the preliminary design load cases for the structural component being designed. Once measured test data for the structural component being designed are obtained the database including histories of finite element modeling analysis data and measured test data is updated. The artificial neural network, in accordance with aspects of the present disclosure, compares the measured test data for the product being designed with the corresponding preliminary design load cases and determines an accuracy of the prediction. The artificial neural network will iteratively internally optimize its nodes, via weighting of the nodes, based on the accuracy of the prediction so that as more histories are added to the database the accuracy of the predicted preliminary design load cases increases.

The method, apparatus and computer program product in accordance with the aspects of the present disclosure may reduce product development times and costs by providing a more accurate prediction of the preliminary design load cases than otherwise would be provided using the same design requirements and objective loads over and over again for similar products.

Illustrative, non-exhaustive examples, which may or may not be claimed, of the subject matter according to the present disclosure are provided below.

Referring to FIG. 1, the aspects of the present disclosure will be described with respect to the aerospace industry but it should be understood that the aspects of the present disclosure may be applied to any industry in which preliminary design load cases are used during product development (e.g. the automotive industry, maritime industry, etc.). FIG. 1 illustrates a vehicle 100 which may be in the preliminary design phase. The vehicle includes at least one new structural component 100SC (see also FIG. 2). The at least one new structural component 100SC may include one or more of an aircraft engine 110, an engine mount 111, a landing gear (such as a main landing gear 120 or a nose landing gear 121), a wing structure (such as the wing 130, horizontal stabilizer 131, or vertical stabilizer 132), a fuselage structure 140, any suitable structural joint 160 of the vehicle 100, any suitable load bearing member 161 (e.g., spars, ribs, stringers, skin, bulkhead, etc.), an assembly interface 162 (including any suitable fasteners and couplings) between two or more structural components of the vehicle 100, and any other suitable structural component of the vehicle 100 (e.g. passenger seat structures 150, etc.).

Still referring to FIG. 1, there may be a plurality of existing (e.g. in service and/or past the product development stage) vehicles 100A-100n that are similar to, but not the same as, the vehicle 100. Each of the existing vehicles 100A-100n includes respective existing structural components 100ESC which again, may be similar to but not the same as the new structural components 100SC of the vehicle 100. For example, existing vehicle 100A includes one or more of an existing aircraft engine 110A, an existing engine mount 111A, an existing landing gear (such as a main landing gear 120A or a nose landing gear 121A), an existing wing structure (such as the wing 130A, horizontal stabilizer 131A, or vertical stabilizer 132A), an existing fuselage structure 140A, and existing passenger seat structures 150A. Similarly, the $n^{th}$ existing vehicle 100n of the plurality of existing vehicles 100A-100n may also include an existing aircraft engine 110n, an existing engine mount 111n, an existing landing gear (such as a main landing gear 120n or a nose landing gear 121n), an existing wing structure (such as the wing 130n, horizontal stabilizer 131n, or vertical stabilizer 132n), an existing fuselage structure 140n, and existing passenger seat structures 150n.

Referring also to FIG. 2, each of the plurality of existing vehicles 100A-100n has corresponding historical data 100AH-100nH associated with each of the existing structural components 100ESC. For example, each of the existing structural components 100ESC of the plurality of existing vehicles 100A-100n has corresponding finite element modeling analysis data 202 and/or measured test data 201 that was/were developed during the design of the respective existing structural components 100ESC. The finite element modeling analysis data 202 and/or measured test data 201 may include any suitable design data of the existing structural components 100ESC including, but not limited to, worst-case static and dynamic loads expected in service, vertical acceleration, lateral acceleration, engine seizure torques, net engine trust, take-off weight, number of aircraft engines, fan unbalance, redline speed, thrust drop, frictional forces, required lift, braking forces, wheel size, number of wheels, landing gear length, spring rates, engine type, engine company, fan to fan case tip rubs, and other suitable measured or calculated data and nonlinearities. The historical data 100AH-100nH associated with each of the existing structural components 100ESC is stored in any suitable database such as the database of existing structural component(s) 200.

As described above, the aspects of the present disclosure pertain to the prediction of the preliminary design load cases 250 for the new structural component 100SC. The preliminary design load cases 250 may be any suitable load case or load cases, such as, e.g., those described herein, that include a combination of different types (e.g. static and/or dynamic) of loads acting on the new structural component 100SC. Unlike the prior art, which merely uses the same load cases that were determined beforehand (e.g. during the calculation of similar existing structure components), the aspects of the present disclosure input a plurality of design parameters to at least one artificial neural network 230 that considers all of the historical data 100AH-100nH for a plurality of similar existing structural components. For example, the new structural component may be an engine mount 111. Rather than just consider the load cases for the engine mount, as would be done in the prior art, the artificial neural network 230 is configured to use as inputs, not only historical data 100AH-100nH for the engine mounts 111A-111n, but also the historical data for the aircraft engines 110A-110n, wing structures 130A-130n, 131A-131n, 132A-132n, the fuselage structure 140A-140n, the landing gear 120A-120n, 121A-121n, etc. so that the preliminary design load cases 250 for the new engine mount 111 (i.e. the new structural component 100SC) are determined based on the totality of historical data 100AH-100nH (e.g. based on the inter-relation of all existing structural components 100ESC and, in one aspect, across manufacturers and types of components) for similar vehicles 100A-100n that include engine mounts 111A-11l n. For example, considering the totality of the historical data 100AH-100nH provides for the determination of the preliminary design load cases using data from similar structural components having different manufacturers and/or different types of structural components performing the same or similar function as the new structural component 100SC. As such, the artificial neural network 230, through iterative optimization and weighting of the hidden nodes 236 (as will be described herein) determines relationships between the different structures of the vehicles 100, 100A-100n that would not be considered under a prior art determination of the preliminary design load cases 250. Because the artificial neural network is configured to consider the historical data 100AH-100nH for each existing structural component (e.g. aircraft engines 110A-110n, wing structures 130A-130n, 131A-131n. 132A-132n, the fuselage structure 140A-140n, the landing gear 120A-120n, 121A-121n, etc.) as a whole, the artificial neural network may be able to provide a prediction for the preliminary design load cases 250 for the new structural component 100SC that more accurately reflects the actual in service loads experienced by the new structural component 100SC. The more accurate predictions of the preliminary design load cases 250 may substantially reduce product development times and costs as significant redesigning of the new structural component 100SC may not be necessary.

Still referring to FIG. 2, while a single artificial neural network 230 is illustrated it should be understood there may be multiple artificial neural networks (ANN) 230A-230n (schematically represented in FIG. 2) coupled to the processor 210, where each neural network corresponds to a respective new structural component 100SC or a respective structural component type (e.g. aircraft engine, engine mount, engine fan blades, wing structures, etc.). The aspects of the present disclosure will be described with respect to artificial neural network 230; however, the aspects of the present disclosure may be applied to each of the multiple neural networks 230A-230n in a manner substantially similar to that described herein. The artificial neural network 230 is designed, by for example, any suitable processor such as processor 210, to include a plurality of neurons (e.g. nodes) to form a numerical model NM for predicting preliminary design load cases 250 of the new structural component 100SC. In one aspect, the numerical model NM is a regression model or any other suitable numerical model for predicting the preliminary design load cases 250. In one aspect the artificial neural network is configured as a feed-forward back-propagation neural network but in other aspects, any other suitable neural network configuration may be used.

The illustration of the artificial neural network 230 is a simplified version of the artificial neural network of the present disclosure. The artificial neural network 230 includes a plurality of input nodes 232. The input nodes 232 are the points within the neural network to which input design parameters are provided for further processing. For example, there may be an input node 232 for each respective input design parameter (such as, e.g., a respective operational characteristic 220A-220n) of a plurality of design parameters 220. The artificial neural network also includes a plurality of output nodes 234. Each output node 234 represents a predicted static load 250A-250n of the preliminary design load cases 250. Between the input nodes 232 and the output nodes 234 are one or more layers 236L of hidden nodes 236. As shown in FIG. 2, the hidden nodes 236 are coupled to some, or all, of the input nodes 232. The hidden nodes 236 are also coupled to some, or all, of the output nodes 234. Each of the hidden nodes 236 performs a mathematical function that is determined or learned during a training phase of the artificial neural network 230. While FIG. 2 illustrates the artificial neural network 230 as including three input nodes 232, three output nodes 234 and one layer 236L of four hidden nodes 236, in other aspects, the artificial neural network 230 includes any suitable number of input nodes 232 (corresponding to, e.g., the number of input design parameters), any suitable number of output nodes 234 (corresponding to, e.g., the number of loads being predicted) and any suitable number of layers 236L of hidden nodes 236 where each layer 236L includes any number of hidden nodes 236.

In accordance with aspects of the present disclosure, the processor 210 is coupled to both the database of existing structural component(s) 200 and the artificial neural network 230. The processor may be any suitable processor 210 including any structure 210S and any suitable memory 210M for carrying out the aspects of the present disclosure described herein. In one aspect, the artificial neural network may be stored in the memory 210M of the processor 210 or in any other suitable storage location accessible by the processor 210. The processor 210 is configured to obtain the historical data 100AH-100nH for each of the existing structural components 100ESC (FIG. 1) of the similar vehicles 100A-100n stored in the database of existing structural component(s) 200. The processor 210 is further configured to train the artificial neural network 230, using the historical data 100AH-100nH so that the artificial neural network 230 predicts the preliminary design load cases 250 for the new structural component 100SC. For example, the processor 210 may train the artificial neural network by, for example, using the finite element modeling analysis data 202 and other suitable historical design criteria as inputs to the artificial neural network 230 and using respective measured test data 201 as outputs.

The input design parameters 220 for the new structural component 100SC include one or more operational characteristics 220A-220n of the new structural component. For example the operational characteristics 220A-220n include one or more of vertical acceleration, lateral acceleration, engine seizure torques, net engine trust, take-off weight, number of aircraft engines, fan unbalance, redline speed, thrust drop, frictional forces, required lift, braking forces, wheel size, number of wheels, landing gear length, spring rates, engine type, engine company, fan to fan case tip rubs, and other suitable measured or calculated data and nonlinearities, etc. In one aspect, the input design parameters 220 for the new structural component 100SC are stored in the memory 210M or any other suitable memory accessible by the processor 210. The processor 210 is configured to input each design parameter 220 for the new structural component 100SC into the artificial neural network 203. For example, each operational characteristic 220A-220n of the input design parameters 220 is input to a respective one of the input nodes 232. The processor 210 utilizes the artificial neural network 230 to predict the preliminary design load cases 250 (e.g. the worst-case static and dynamic loads expected in service of the new structural component 100SC) based on, for example, relationships determined by the artificial neural network 230 between the operational characteristics 220A-220n defining the input design parameters 220 and the historical data 100AH-100nH of the existing structural components 100ESC (FIG. 1).

Referring to FIGS. 2 and 3, the preliminary design load cases 250 for the new structural component 100SC include a set of predicted static loads 250A-250n, or any other suitable loads, that represent the ultimate design static or dynamic loads that are to be expected during service (again referred to herein as "envelope loads") of the new structural component 100SC. The envelope loads are a conservative set of loads for a given structure to assure adequate margins of safety. For exemplary purposes only, the new structural component 100SC may be the engine mount 111. The predicted static loads 250A-250n determined by the artificial neural network 230 may include a force Fx in the X-direction, a force Fy in the Y-direction, a force Fz in the Z-direction, a moment Mx about the X-axis, a moment My about the Y-axis, and a moment Mz about the Z-axis. These forces Fx, Fy, Fz and moments Mx, My, Mz may be determined from, depending on the relationships established by the artificial neural network 230 between the input design parameters 220 and the historical data 100AH, 100nH, a combination of forces predicted to be exerted on the engine mount 111 by the wing 130, 130A-130n, by the aircraft engine 110, 110A-110n, aerodynamic forces from historical measured test data, etc.; where at least different types of aircraft engines, wings, and engine mounts for each of the vehicles 100A-100n, as well as different manufacturers of the aircraft engines, wings and engine mounts are considered by the artificial neural network 230 when predicting the forces Fx, Fy, Fz and moments Mx, My, Mz.

The predicted static loads 250A-250n of the preliminary design load cases 250 may be used as the basis for finite element modeling analysis 261 for determining finite element modeling analysis data 260 of the new structural component 100SC. This finite element modeling analysis data 260 leads to the production of a prototype of the new structural component 100SC. Testing of the prototype of the new structural component 100SC is performed and measured test data 270 is produced. In one aspect, the measured test data 270 verifies the accuracy of the predicted preliminary design load cases 250.

Referring to FIGS. 2 and 4, the artificial neural network 230 is configured to iteratively optimize, for example, the numerical model NM (which in one aspect is a regression model) formed by the artificial neural network 230 using the preliminary design load cases 250, as determined/predicted by the artificial neural network 230, for the new structural component 100SC. For example, the processor 210 is configured to update the database of existing structural component(s) 200 with one or more of the measured test data 270 and finite element modeling analysis data 260 obtained using the preliminary design load cases 250 for the new structural component 100SC predicted by the artificial neural network 230. The processor 210 is also configured to re-train the artificial neural network 230 by causing the artificial neural network 230 to internally execute a trade study 400. The trade study 400, internally executed by the artificial neural network 230, verifies correlations between the historical data 100AH-100nH and the predicted preliminary design load cases 250 for adjusting weight factors (e.g. nodal weights 410) of the hidden nodes 236 of the artificial neural network 230. The artificial neural network 230 may nm the trade study 400 each time the database of existing structural component(s) 200 is updated with the one or more of the measured test data 270 and finite element modeling analysis data 260 obtained using the preliminary design load cases 250 for the new structural component 100SC. The verification of the correlations between the historical data and the adjustment of the nodal weights 410 enable the artificial neural network 230 to provide the preliminary design load cases 250 for other similar new structural components 100SC with increasing accuracy.

Referring to FIGS. 2 and 5 an exemplary operation for predicting the preliminary design load cases 250 using the artificial neural network 230 in accordance with aspects of the present disclosure will be described. The processor 210 obtains historical data 100AH-100nH corresponding to an existing structural component 100ESC (FIG. 1) (FIG. 5, Block 501). As described above, the historical data 100AH-100nH includes at least finite element modeling analysis data 202 and measured test data 201 for the existing structural component(s) 100ESC (FIG. 1). The processor 210 designs the artificial neural network 230 to include a plurality of neurons (e.g. the input nodes 232, the hidden nodes 236, and the output nodes 234) to form the numerical model NM (such as a regression model) for the preliminary design load cases 250 of the new structural component 100SC (FIG. 5, Block 505). The processor 210 trains the artificial neural network 230, using the historical data 100AH-100nH for the existing structural component(s) 100ESC (FIG. 1), to predict the preliminary design load cases 250 for the new structural component 100SC (FIG. 5. Block 510). The input design parameters 220 for the new structural component 100SC are provided to the artificial neural network 230 (FIG. 5, Block 515). For example, as described above, each of the operational characteristics 220A-220n included in the input design parameters 220 is input to a respective one of the input nodes 232 of the artificial neural network 230. The artificial neural network 230 predicts the preliminary design load cases 250 for the new structural component 100SC (FIG. 5, Block 520) based on, for example, the input design parameters 220 and the historical data 100AH-100nH.

In one aspect, the preliminary design load cases 250 are used as the basis for performing finite element modeling analysis data 260. The finite element modeling analysis data 260 is performed (FIG. 5, Block 525) and measured test data 270 is obtained from, for example, prototypes that are based on the finite element modeling analysis data 260 (FIG. 5, Block 530). The artificial neural network 230 iteratively optimizes (FIG. 5, Block 535) the numerical model NM (such as the regression model) formed by the artificial neural network 230 using the preliminary design load cases 250 for the new structural component 100SC that have been determined by the artificial neural network 230. For example, as described herein, the artificial neural network 230 is re-trained by internally executing a trade study 400 (FIG. 4) to verify correlations between the historical data 100AH-100nH and the preliminary design load cases 250 for the new structural component 100SC predicted by the artificial neural network 230 for adjusting weight factors 410 of nodes 236 of the artificial neural network 230. In one aspect, the historical data 100AH-100nH is updated with the measured test data 270 obtained using the preliminary design load cases 250 for the new structural component 100SC predicted by the artificial neural network 230 (FIG. 5, Block 540).

The aspects of the present disclosure may be described in the context of an aircraft manufacturing and service method 1100 as shown in FIG. 6 and an aircraft (i.e. vehicle 100) as shown in FIG. 1. During pre-production, illustrative method 600 may include specification and design 604 of the vehicle 100 and material procurement 606. During production, component and subassembly manufacturing 608 and system integration 610 of the vehicle 100 take place. Thereafter, the vehicle 100 may go through certification and delivery 612 to be placed in service 614. While in service by a customer, the vehicle 100 is scheduled for routine maintenance and service 616 (which may also include modification, reconfiguration, refurbishment, and so on).

Each of the processes of the illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 1, the vehicle 100 produced by the illustrative method 600 may include an airframe 140F (which may form the fuselage structure 140) with a plurality of high-level systems and an interior 151. Examples of high-level systems include one or more of a propulsion system 110P, an electrical system 126, a hydraulic system 128, and an environmental system 152. Any number of other systems may be included. As noted herein, although an aerospace example is shown, the principles of the invention may be applied to other industries, such as the automotive industry and maritime industry.

Apparatus and methods shown or described herein may be employed during any one or more of the stages of the manufacturing and service method 600. For example, components or subassemblies corresponding to component and subassembly manufacturing 608 may be fabricated or manufactured in a manner similar to components or subassemblies produced while the vehicle 100 is in service. Also, one or more aspects of the apparatus, method, or combination thereof may be utilized during the production states 608 and 610, for example, by substantially expediting assembly of or reducing the cost of a vehicle 100. Similarly, one or more aspects of the apparatus or method realizations, or a combination thereof, may be utilized, for example and without limitation, while the vehicle 100 is in service, e.g., maintenance and service 616 (such as when, for example, a new component is designed for retrofit to an existing vehicle 100).

The following are provided in accordance with the aspects of the present disclosure:

A1. A method for predicting preliminary design load cases using an artificial neural network, the method comprising:

obtaining, with a processor, historical data corresponding to an existing structural component, the historical data including finite element modeling analysis data and measured test data for the existing structural component;

designing the artificial neural network to include a plurality of neurons to form a numerical model for preliminary design load cases of a new structural component;

training, with the processor and the historical data for the existing structural component, the artificial neural network to predict the preliminary design load cases for the new structural component;

providing input design parameters for the new structural component to the artificial neural network; and predicting, with the artificial neural network, the preliminary design load cases for the new structural component.

A2. The method of paragraph A1, wherein the input design parameters include one or more operational characteristic of the new structural component.

A3. The method of paragraph A1, wherein the new structural component comprises one or more of an aircraft engine, an engine mount, a landing gear, a wing structure, and a fuselage structure.

A4. The method of paragraph A1, wherein the preliminary design load cases include a set of predicted static loads for the new structural component.

A5. The method of paragraph A4, wherein the set of static loads represent envelope loads of the new structural component.

A6. The method of paragraph A1, further comprising iteratively optimizing a regression model formed by the artificial neural network using the preliminary design load cases for the new structural component determined by the artificial neural network.

A7. The method of paragraph A6, wherein the artificial neural network is re-trained by internally executing a trade study to verify correlations between the historical data and preliminary design load cases for the new structural component predicted by the artificial neural network for adjusting weight factors of nodes of the artificial neural network.

A8. The method of paragraph A1, wherein the historical data is updated with measured test data obtained using the preliminary design load cases for the new structural component predicted by the artificial neural network.

A9. The method of paragraph A1, wherein the artificial neural network comprises a feed-forward back-propagation neural network.

A10. The method of paragraph A1, wherein the preliminary design load cases for the new structural component predicted by the artificial neural network are the basis for a finite element modeling analysis of the new structural component.

A11. The method of paragraph A1, wherein the historical data comprises finite element modeling analysis data and measured test data for a plurality of related vehicles having similar structural components.

B1. An apparatus for predicting preliminary design load cases with an artificial neural network, the apparatus comprising:

a database including historical data corresponding to an existing structural component, the historical data including finite element modeling analysis data and measured test data for the existing structural component;

a processor in communication with the database, the processor being configured to design at least one artificial neural network to include a plurality of neurons to form a numerical model for preliminary design load cases of a new structural component;

train the at least one artificial neural network to predict the preliminary design load cases for the new structural component using the historical data for the existing structural component;

input design parameters for the new structural component into the artificial neural network; and utilize the artificial neural network to predict the preliminary design load cases for the new structural component.

B2. The apparatus of paragraph B1, wherein the input design parameters include one or more operational characteristics of the new structural component.

B3. The apparatus of paragraph B1, wherein the new structural component comprises one or more of an aircraft engine, an engine mount, a landing gear, a wing structure, and a fuselage structure.

B4. The apparatus of paragraph B1, wherein the preliminary design load cases include a set of predicted static loads for the new structural component.

B5. The apparatus of paragraph B4, wherein the set of static loads represent envelope loads of the new structural component.

B6. The apparatus of paragraph B1, wherein the artificial neural network is configured to iteratively optimize a regression model formed by the artificial neural network using the preliminary design load cases for the new structural component determined by the artificial neural network.

B7. The apparatus of paragraph B6, wherein the processor re-trains the at least one artificial neural network by causing the artificial neural network to internally execute a trade study to verify correlations between the historical data and preliminary design load cases for the new structural component predicted by the artificial neural network for adjusting weight factors of nodes of the at least one artificial neural network.

B8. The apparatus of paragraph B1, wherein processor is configured to update the historical data with measured test data obtained using the preliminary design load cases for the new structural component predicted by the artificial neural network.

B9. The apparatus of paragraph B1, wherein the artificial neural network comprises a feed-forward back-propagation neural network.

B10. The apparatus of paragraph B1, wherein the preliminary design load cases for the new structural component predicted by the artificial neural network are the basis for a finite element modeling analysis of the new structural component.

B11. The apparatus of paragraph B1, wherein the historical data comprises finite element modeling analysis data and measured test data for a plurality of related vehicles having similar structural components.

C1. A non-transitory computer readable medium storing computer readable instructions that when executed by a computer cause the computer to perform a method comprising:

obtaining, with a processor, historical data corresponding to an existing structural component, the historical data including finite element modeling analysis data and measured test data for the existing structural component;

designing an artificial neural network to include a plurality of neurons to form a numerical model for preliminary design load cases of a new structural component;

training, with the processor and the historical data for the existing structural component, the artificial neural network to predict preliminary design load cases for the new structural component;

providing input design parameters for the new structural component to the artificial neural network; and predicting, with the artificial neural network, the preliminary design load cases for the new structural component.

C2. The non-transitory computer readable medium of paragraph C1, wherein the input design parameters include one or more operational characteristics of the new structural component.

C3. The non-transitory computer readable medium of paragraph C1, wherein the new structural component comprises one or more of an aircraft engine, an engine mount, a landing gear, a wing structure, and a fuselage structure.

C4. The non-transitory computer readable medium of paragraph C1, wherein the preliminary design load cases include a set of static loads for the new structural component.

C5. The non-transitory computer readable medium of paragraph C4, wherein the set of static loads represent envelope loads of the new structural component.

C6. The non-transitory computer readable medium of paragraph C1, further comprising iteratively optimizing a regression model formed by the artificial neural network using the preliminary design load cases for the new structural component determined by the artificial neural network.

C7. The non-transitory computer readable medium of paragraph C6, wherein the artificial neural network is re-trained by internally executing a trade study to verify correlations between the historical data and predicted fan blade out design data for adjusting weight factors of nodes of the artificial neural network.

C8. The non-transitory computer readable medium of paragraph C1, wherein the historical data is updated with measured test data obtained using the preliminary design load cases for the new structural component predicted by the artificial neural network.

C9. The non-transitory computer readable medium of paragraph C1, wherein the artificial neural network comprises a feed-forward back-propagation neural network.

C10. The non-transitory computer readable medium of paragraph C1, wherein the preliminary design load cases for the new structural component predicted by the artificial neural network are the basis for a finite element modeling analysis of the new structural component.

C11. The non-transitory computer readable medium of paragraph C1, wherein the historical data comprises finite element modeling analysis data and measured test data for a plurality of related vehicles having similar structural components.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5, 6, and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A method for predicting preliminary design load cases using an artificial neural network, the method comprising:
   obtaining, with a processor, historical data corresponding to an existing structural component, the historical data including finite element modeling analysis data and measured test data for the existing structural component where the existing structural component is a structural component that is one or more of in service and past product development;
   designing the artificial neural network to include a plurality of neurons to form a numerical model for preliminary design load cases of a new structural component that is different than the existing structural component;
   training, with the processor and the historical data for the existing structural component, the artificial neural network to predict the preliminary design load cases for the new structural component;
   providing input design parameters for the new structural component to the artificial neural network; and
   predicting, with the artificial neural network, the preliminary design load cases for the new structural component.

2. The method of claim 1, wherein the input design parameters include one or more operational characteristic of the new structural component.

3. The method of claim 1, wherein the new structural component comprises one or more of an aircraft engine, an engine mount, a landing gear, a wing structure, a fuselage structure, a structural joint, a load bearing member, and an assembly interface.

4. The method of claim 1, wherein the preliminary design load cases include a set of predicted static loads for the new structural component.

5. The method of claim 4, wherein the set of static loads represent envelope loads of the new structural component.

6. The method of claim 1, further comprising iteratively optimizing a regression model formed by the artificial neural network using the preliminary design load cases for the new structural component determined by the artificial neural network.

7. The method of claim 6, wherein the artificial neural network is re-trained by internally executing a trade study to verify correlations between the historical data and preliminary design load cases for the new structural component predicted by the artificial neural network for adjusting weight factors of nodes of the artificial neural network.

8. The method of claim 1, wherein the historical data is updated with test data obtained using the preliminary design load cases for the new structural component predicted by the artificial neural network.

9. The method of claim 1, wherein the historical data comprises finite element modeling analysis data and measured test data for a plurality of related vehicles having similar structural components.

10. An apparatus for predicting preliminary design load cases with an artificial neural network, the apparatus comprising:
- a database including historical data corresponding to an existing structural component, the historical data including finite element modeling analysis data and measured test data for the existing structural component where the existing structural component is a structural component that is one or more of in service and past product development;
- a processor in communication with the database, the processor being configured to
  - design at least one artificial neural network to include a plurality of neurons to form a numerical model for preliminary design load cases of a new structural component that is different than the existing structural component;
  - train the at least one artificial neural network to predict the preliminary design load cases for the new structural component using the historical data for the existing structural component;
  - input design parameters for the new structural component into the artificial neural network; and
  - utilize the artificial neural network to predict the preliminary design load cases for the new structural component.

11. The apparatus of claim 10, wherein the artificial neural network is configured to iteratively optimize a regression model formed by the artificial neural network using the preliminary design load cases for the new structural component determined by the artificial neural network.

12. The apparatus of claim 11, wherein the processor re-trains the at least one artificial neural network by causing the artificial neural network to internally execute a trade study to verify correlations between the historical data and preliminary design load cases for the new structural component predicted by the artificial neural network for adjusting weight factors of nodes of the at least one artificial neural network.

13. The apparatus of claim 10, wherein processor is configured to update the historical data with test data obtained using the preliminary design load cases for the new structural component predicted by the artificial neural network.

14. The apparatus of claim 10, wherein the artificial neural network comprises a feed-forward back-propagation neural network.

15. A non-transitory computer readable medium storing computer readable instructions that when executed by a computer cause the computer to perform a method comprising:
- obtaining, with a processor, historical data corresponding to an existing structural component, the historical data including finite element modeling analysis data and measured test data for the existing structural component where the existing structural component is a structural component that is one or more of in service and past product development;
- designing an artificial neural network to include a plurality of neurons to form a numerical model for preliminary design load cases of a new structural component that is different than the existing structural component;
- training, with the processor and the historical data for the existing structural component, the artificial neural network to predict preliminary design load cases for the new structural component;
- providing input design parameters for the new structural component to the artificial neural network; and
- predicting, with the artificial neural network, the preliminary design load cases for the new structural component.

16. The non-transitory computer readable medium of claim 15, wherein the input design parameters include one or more operational characteristics of the new structural component.

17. The non-transitory computer readable medium of claim 15, further comprising iteratively optimizing a regression model formed by the artificial neural network using the preliminary design load cases for the new structural component determined by the artificial neural network.

18. The non-transitory computer readable medium of claim 17, wherein the artificial neural network is re-trained by internally executing a trade study to verify correlations between the historical data and predicted fan blade out design data for adjusting weight factors of nodes of the artificial neural network.

19. The non-transitory computer readable medium of claim 15, wherein the historical data is updated with test data obtained using the preliminary design load cases for the new structural component predicted by the artificial neural network.

20. The non-transitory computer readable medium of claim 15, wherein the historical data comprises finite element modeling analysis data and measured test data for a plurality of related vehicles having similar structural components.

* * * * *